US008282482B2

(12) United States Patent
Yun

(10) Patent No.: US 8,282,482 B2
(45) Date of Patent: Oct. 9, 2012

(54) SYSTEM AND METHOD FOR CYBER TRAINING OF MARTIAL ART ON NETWORK

(76) Inventor: Sang Bum Yun, Vancouver, WA (US)

( * ) Notice: Subject to any disclaimer, the term of this patent is extended or adjusted under 35 U.S.C. 154(b) by 0 days.

(21) Appl. No.: 13/179,560

(22) Filed: Jul. 10, 2011

(65) Prior Publication Data

US 2012/0052947 A1    Mar. 1, 2012

(30) Foreign Application Priority Data

Aug. 24, 2010  (KR) .................. 10-2010-0082131

(51) Int. Cl.
  *A63F 13/00*   (2006.01)
(52) U.S. Cl. ........................................ 463/32
(58) Field of Classification Search .............. 463/5, 7, 463/8, 23, 42, 32
  See application file for complete search history.

(56) References Cited

U.S. PATENT DOCUMENTS
2005/0070355 A1   3/2005   Shimizu

FOREIGN PATENT DOCUMENTS
KR   2005-30156 A    3/2005
KR   2005-118385 A   12/2005

OTHER PUBLICATIONS

Korean Patent Office Action issued on Oct. 29, 2010.

*Primary Examiner* — Peter DungBa Vo
*Assistant Examiner* — Jeffrey Wong
(74) *Attorney, Agent, or Firm* — Justin H. Kim; Maxon IP LLC

(57) ABSTRACT

Disclosed herein is a system and method for virtual martial arts sparring using a network. The system includes a user terminal, a network server, data management means, and a network administrator terminal. The user terminal accesses the Internet to exchange user information with a network server, receives sparring partner information to retrieve and select a discipline, a grade, an area and sex-specific sparring conditions, receive sparring progress information according to the selected sparring condition, and perform a sparring function. The network server includes user information management means, sparring partner information management means, sparring progress information management means, image information management means. The data management means includes a user information database (DB), a sparring partner information DB, a sparring progress information DB, and an image information DB, and inputs and outputs the information. The network administrator terminal accesses the network server to exchange network administrator information, and manages the system.

21 Claims, 12 Drawing Sheets

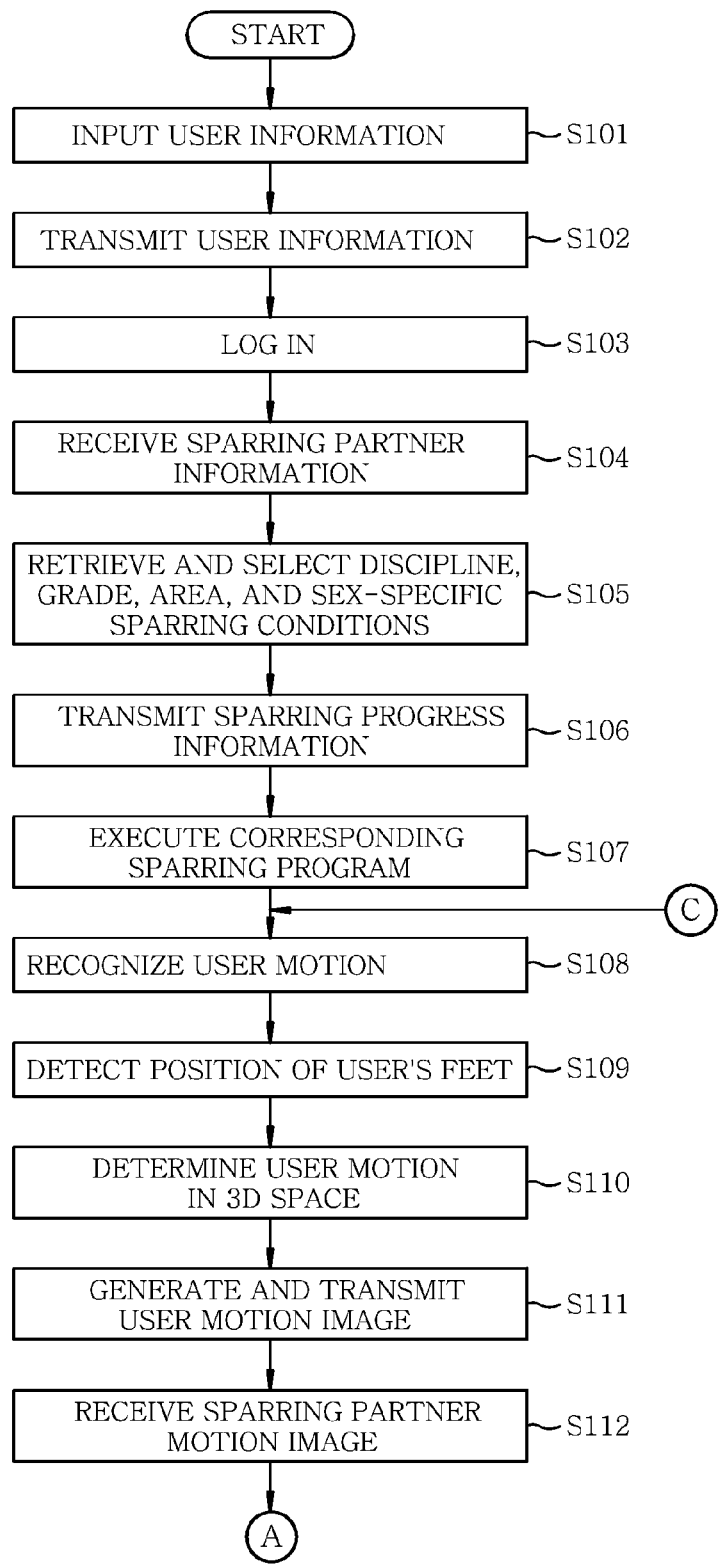

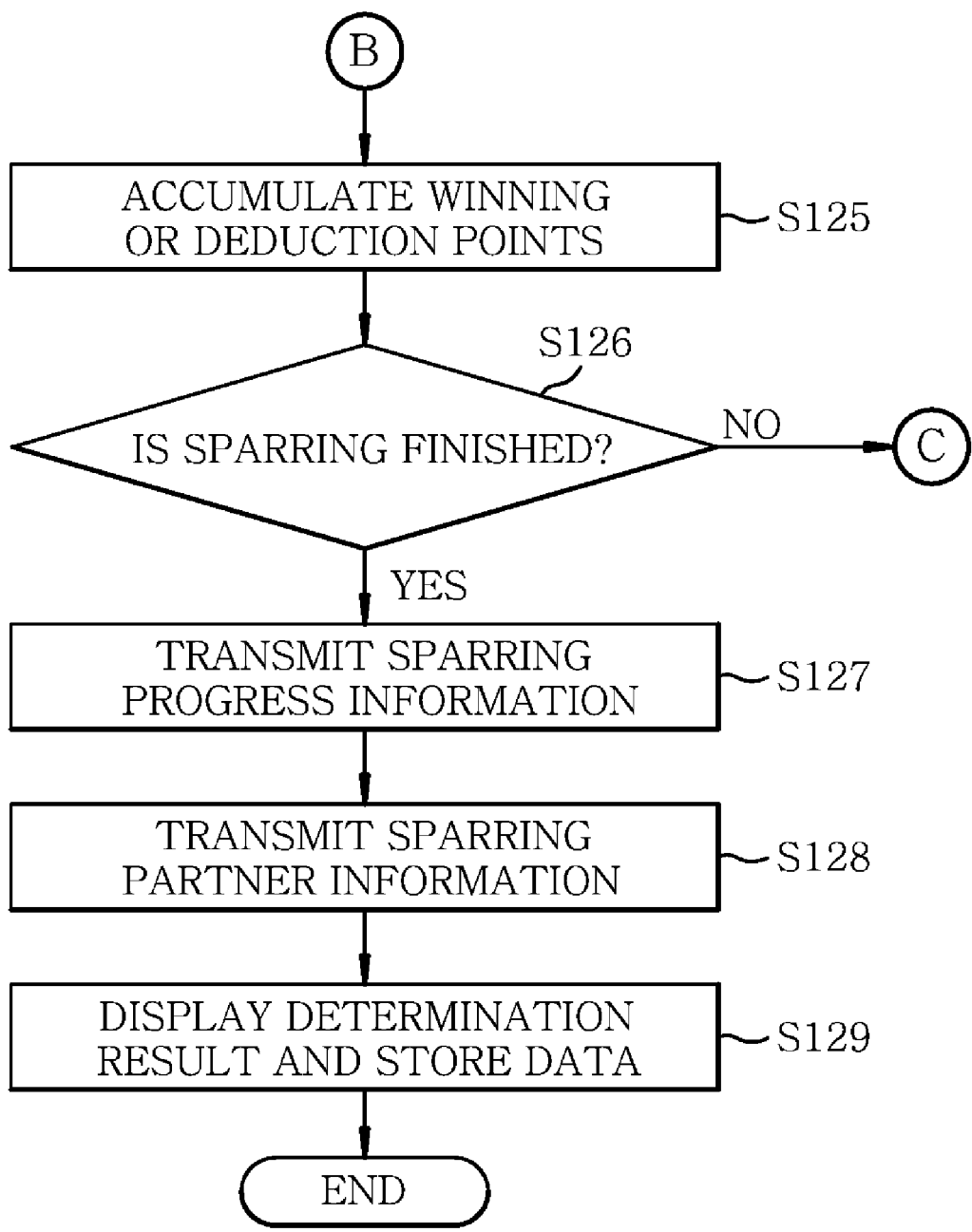

SYSTEM AND METHOD FOR CYBER TRAINING OF MARTIAL ART ON NETWORK

CLAIM FOR PRIORITY

This application claims priority to Korean Patent Application No. 10-2010-0082131 filed on Aug. 24, 2010, the entirety of which is incorporated herein by reference.

BACKGROUND

1. Technical Field

The present invention relates in general to a system and a method for virtual martial arts sparring using a network, and more specifically, to a system and method for virtual martial arts sparring in which each of a plurality of terminals senses each motion of a user to generate a three-dimensional (3D) image, and performs a sparring process using network data communication, so that the user can effectively spar with a virtual character of a sparring partner by herself or himself without temporal and spatial constraints and in which risks such as injury can be avoided.

2. Background Technology

In the present invention, the term "martial arts" denotes various martial arts, such as taekwondo, kung fu, karate, qigong and kendo, various combative sports, such as boxing, wrestling, and judo, and the like.

To train in a martial art, a trainee generally should attend a gym or academy. However, it is difficult for the busy people of today to train in martial arts due to temporal and spatial constraints.

As a conventional technique for solving these problems, a method of receiving educational video data to train in martial arts or daily sports and informing a user of the degree of training achievement by remote online examination has been disclosed in Korean Patent Publication No. 2002-0041688 entitled "Method for Educating and Examining Accomplishment Steps of Martial Arts and Living Athletics Online."

However, the conventional technique provides only a one-way explanation-oriented educational function of simply playing an educational video. Since information is not exchanged in real time between a user and an apparatus, the user cannot effectively perform a sparring process alone.

Also, it is difficult to select a sparring partner of an appropriate martial arts level off-line, and trainees may be injured during actual sparring.

Further, when attackable parts are limited to prevent injury, it is difficult to make an actual attack, and sparring effects cannot be improved.

SUMMARY

Accordingly, the present invention is provided to substantially overcome one or more of the problems resulting from the constraints and disadvantages of the conventional technology.

There is provided a system and method for virtual sparring in martial arts using a network in which a plurality of terminals sense each motion of a user to generate a three-dimensional (3D) image, and perform a sparring process through network data communication, so that the user alone can effectively spar with a virtual character of a sparring partner without temporal and spatial constraints, and can improve sparring effects while preventing injuries.

In some embodiments, a system for virtual martial arts sparring using a network includes: a user terminal configured to access the Internet to exchange user information with a network server, receive sparring partner information to retrieve and select a discipline, grade, area, and gender-specific sparring conditions, receive sparring progress information according to the selected sparring conditions so that the corresponding sparring program can be run, and perform a sparring function by sending and receiving a user motion image, a sparring partner motion image, and a signal representative of a hit; a network server including user information management means for receiving the user information from the user terminal and comparing the user information with previously stored information to allow a user to log in, sparring partner information management means for transmitting the sparring partner information to the user terminal and updating and managing grade, area, and sex information and sparring records for a sparring partner, sparring progress information management means for transmitting the sparring progress information to the user terminal and updating and managing a sparring sequence, winning and deduction point information, victory and defeat information, and ranking information, image information management means for receiving the user motion image from the user terminal, performing an update with the user motion image, and managing the user motion image, and communication means for exchanging information with the user terminal; data management means including the user information database (DB) for storing the user information, a sparring partner information DB for storing the sparring partner information, a sparring progress information DB for storing the sparring progress information, an image information DB for storing the user motion image, and configured to input and output the respective pieces of information in response to a request from the network server; and a network administrator terminal configured to access the network server to exchange network administrator information and manage the system.

The sparring progress information management means may record and manage sparring rankings according to area, age, and sex, and more specifically, the sparring rankings are determined by relative evaluation within the corresponding categories.

An area of the user terminal may be checked based on the Internet protocol (IP) address of the user allocated by an Internet service provider (ISP).

The user terminal may include: an input unit configured to receive the user information to allow the user to log in and select the discipline, grade, area, and sex-specific sparring conditions; a motion recognition unit configured to detect a movement speed, a distance, a position, and an angle of the user to recognize the user motion; a position detector configured to detect a position of the user's feet on a plane; a data storage unit configured to store the sparring program in accordance with the discipline, grade, area, and sex-specific sparring conditions corresponding to the selection of the input unit and store the user information and an evaluation result; a controller configured to execute the sparring program stored in the data storage unit according to the selection of the input unit, evaluate the user motion in 3D space with reference to the user motion recognized by the motion recognition unit and the position of the user's feet detected by the position detector, compare the user motion in 3D space with a sparring partner motion received from the network server to determine an effective attack value, calculate the corresponding points to accumulate winning or deduction points, generate the user motion image and the sparring partner motion image using a previously stored virtual character, and generate a user hit reaction image and a sparring partner hit reaction image using a virtual character of the sparring partner according to the determined effective attack value to generate the signal representative of a hit; a main image display unit configured to display the user motion image and the sparring partner motion image of the controller; a hit representation unit configured to generate physical vibrations or a physical impact in response to the signal representative of a hit from the controller and apply them to the user's body; and a communication unit configured to send and receive the user information, the sparring partner information, the sparring progress information, the signal representative of a hit and the motion images with the communication means of the network server and transfer the pieces of information, the signal representative of a hit, and the motion images to the controller.

The input unit may include: a login key configured to receive the user information and allow the user to log in; and a sparring condition selection key configured to select at least one from among the discipline, grade, area, and sex-specific sparring conditions.

The motion recognition unit may consist of a plurality of motion capture cameras configured to detect movement of a plurality of markers attached to the user's body using infrared photography to recognize the user motion.

The motion recognition unit may include at least one of a geomagnetic sensor configured to sense a direction of terrestrial magnetism, an acceleration sensor configured to sense acceleration by accelerating a piezoelectric material, and a gyro sensor configured to sense angular acceleration based on the vertical force of a rotating angle. Here, the at least one of the sensors may be attached to the user's body or clothing.

The position detector may include a resistive touchpad configured to measure the position of coordinates pressed by the user's feet, having a predetermined area, and formed of two panels stacked to generate a resistance at a pressed portion.

The controller may include: a program execution module configured to execute the sparring program stored in the data storage unit in accordance with the discipline, grade, area, and sex-specific sparring conditions selected by the input unit; a motion determination module configured to determine the user motion in 3D space with reference to the user motion recognized by the motion recognition unit and the position of the user's feet detected by the position detector; a comparison module configured to decide whether the user motion and the sparring partner motion received from the network server overlap each other in a predetermined space; a determination module configured to determine the effective attack value according to movement speeds, distances, positions, and angles of the respective motions, calculate the corresponding points, and accumulate the winning or deduction points when the comparison module determines that the user motion and the sparring partner motion overlap each other; an image generation module configured to generate the user motion image and the sparring partner motion image as a main image, using the previously stored virtual character, and produce the hit reaction images using the virtual character of the sparring partner according to the effective attack value determined by the determination module; and a hit representation module configured to generate and output the signal representative of a hit according to the effective attack value.

The image generation module may further generate an effect image and a background image according to the user motion image of the main image display unit, and include a background image display unit configured to display the effect image and the background image on a flat panel display (FPD) module.

The controller may further include: a sound generation module configured to generate sound effects and background music according to the main image, the effect image, and the background image generated by the image generation module; and a sound output unit configured to output the sound effects and the background music generated by the sound generation module using a speaker.

The main image display unit may include: 3D glasses worn by the user; and a 3D image display module configured to display a 3D image to be three-dimensionally viewed via the 3D glasses on a screen.

The main image display unit may include a hologram image display module configured to display successive 3D images by generating interference fringe patterns using the principle of holography.

The main image display unit may include a head mounted display (HMD) module configured to be put on the user's head and to display a realized image on an HMD screen.

The system may further include a user image capturing unit configured to capture an image of the user. Here, the controller may generate the user motion image using the image captured by the user image capturing unit.

In other embodiments, a method for virtual martial arts sparring using a network includes: receiving, at user information management means of a network server accessing the Internet, user information transmitted from a user terminal, and comparing the user information with information previously stored in a user information DB to allow a user to log in; receiving, at the user terminal, sparring partner information, and selecting and transmitting a discipline, grade, area, and sex-specific sparring conditions, reading, at sparring progress information management means, sparring progress information according to the selection from a sparring progress information DB and transmitting the sparring progress information to the user terminal, and executing, at the user terminal, a sparring program according to the sparring progress information; detecting, at a motion recognition unit of the user terminal, a movement speed, a distance, a position, and an angle of the user to recognize a user motion, detecting, at a position detector, a position of the user's feet on a plane, and determining, at a controller, a user motion in 3D space with reference to the user motion recognized by the motion recognition unit and the position of the user's feet detected by the position detector; generating, at the controller of the user terminal, a user motion image using a previously stored virtual character according to the user motion, transmitting the user motion image, receiving a sparring partner motion image from the network server, displaying the user motion image and the sparring partner motion image as a main image together with a background image on a main image display unit, and generating and outputting sound according to the main image and the background image; determining whether the user motion and a sparring partner motion received from the network server overlap each other in a predetermined space, and when the user motion and the sparring partner motion overlap each other, determining an effective attack value according to movement speeds, distances, positions, and angles of the respective motions, generating and displaying a hit reaction image using a virtual character of a sparring partner according to the determined effective attack value, and exchanging a signal representative of a hit according to the effective attack value to operate a hit representation module; and calculating the corresponding points according to the effective attack value to accumulate winning or deduction points, transmitting the corresponding sparring partner information and the corresponding sparring progress information to update a sparring partner information DB and the sparring progress information DB, recording sparring rankings according to area, age, and sex, and displaying an evaluation result on a screen.

An area of the user terminal may be checked based on the IP address of the user allocated by an ISP.

The recognizing the user motion may include attaching a plurality of markers to the user's body and detecting motions of the markers using infrared photography using a plurality of motion capture cameras to recognize the user motion.

The recognizing the user motion may include sensing a direction of terrestrial magnetism using a geomagnetic sensor attached to the user's body or clothing, accelerating a piezoelectric material and sensing an acceleration using an acceleration sensor, or sensing an angular acceleration based on a vertical force of a rotating angle using a gyro sensor, to recognize the user motion.

The displaying the main image may include further generating, at the controller, an effect image and the background image, and displaying, at a background image display unit, the effect image and the background image on the screen.

The outputting the sound may include generating, at the controller, sound effects and background music according to the user motion image and the sparring partner motion image, and outputting, at a sound output unit, the sound effects and the background music using a speaker.

The displaying the main image may include displaying a 3D image viewed through 3D glasses worn by the user on the screen using a 3D image display module, displaying successive 3D images by generating interference fringe patterns based on the principle of holography using a hologram image display module, or putting an HMD module on the user's head to display a realized image on an HMD screen.

BRIEF DESCRIPTION OF DRAWINGS

Embodiments of the present invention will become more apparent by describing in detail embodiments of the present invention with reference to the accompanying drawings, in which:

FIGS. 10A to 10C are flowcharts illustrating a method for virtual martial arts sparring according to embodiments of the present invention.

DESCRIPTION OF EMBODIMENTS OF THE PRESENT INVENTION

Figure 1:
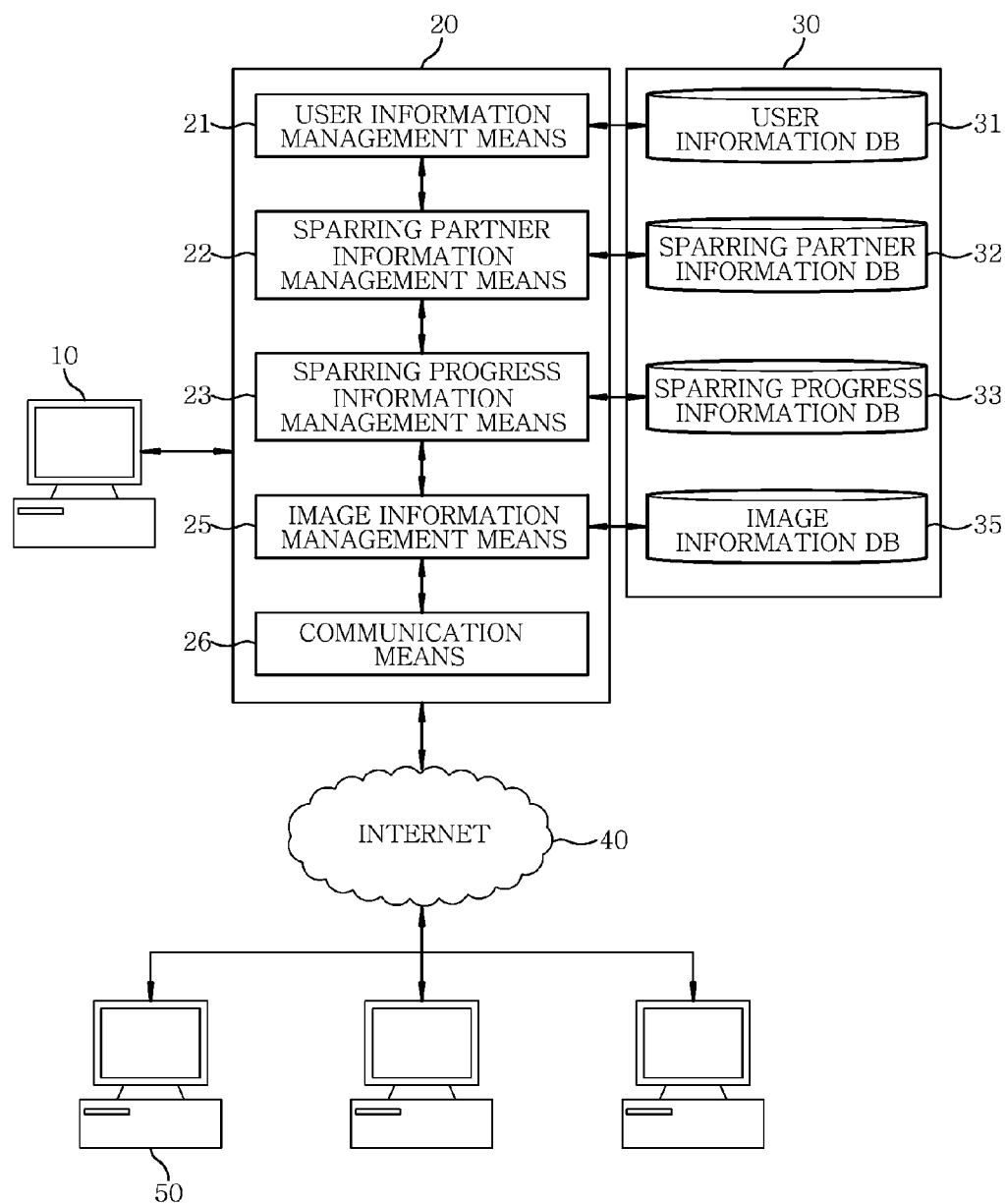
FIG. 1 is a block diagram of a system for virtual martial arts sparring using a network according to embodiments of the present invention.

Embodiments of the present invention are disclosed herein. However, specific structural and functional details disclosed herein are merely illustrative for purposes of describing embodiments of the present invention, but embodiments of the present invention may be embodied in many alternative forms and should not be construed as being limited to embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

FIG. 1 is a block diagram of a system for virtual martial arts sparring using a network according to embodiments of the present invention.

As shown in the drawing, the system includes a network administrator terminal 10, a network server 20, user information management means 21, sparring partner information management means 22, sparring progress information management means 23, image information management means 25, communication means 26, data management means 30, a user information database (DB) 31, a sparring partner information DB 32, a sparring progress information DB 33, an image information DB 35, the Internet 40, and a user terminal 50.

The user terminal 50 may be installed in a house, a gym, or an academy and used without temporal and spatial constraints.

The user terminal 50 accesses the Internet 40 to exchange user information with the network server 20, receives sparring partner information to retrieve and select discipline, grade, area and sex-specific sparring conditions, receives sparring progress information according to the selected conditions to execute the corresponding sparring program, and exchange a sparring partner motion image and a signal representative of a hit together with a user motion image, thereby performing a sparring function. A detailed constitution of the user terminal 50 will be described later with reference to the appended FIGS. 2 to 4.

The network server 20 includes the user information management means 21, the sparring partner information management means 22, the sparring progress information management means 23, the image information management means 25, and the communication means 26.

The user information management means 21 receives the user information from the user terminal 50, compares the received user information with previously stored information, and allows a user to log in.

The sparring partner information management means 22 exchanges sparring partner information with the user terminal 50, and updates and manages the grade, area, and sex information about sparring partners and sparring records.

The sparring progress information management means exchanges sparring progress information with the user terminal 50, and updates and manages a sparring sequence, winning and deduction point information, victory and defeat information, and ranking information.

The image information management means 25 receives the user motion image from the user terminal 50 to perform updatess and manage the received user motion image.

The communication means 26 exchanges information with the user terminal 50.

The data management means 30 includes the user information DB 31 storing the user information, the sparring partner information DB 32 storing the sparring partner information, the sparring progress information DB 33 storing the sparring progress information, and the image information DB 35 storing the user motion image, and inputs and outputs the respective pieces of information in response to a request from the network server 20.

The network administrator terminal 10 accesses the network server 20 to exchange network administrator information and manage the system.

The sparring progress information management means 23 records and manages sparring rankings according to area, age, and sex, and more specifically, the sparring progress information management means 23 determines the rankings by relative evaluation within the corresponding categories.

An area of the user terminal 50 may be checked based on an Internet protocol (IP) address of the user allocated by an Internet service provider (ISP).

Figure 2:
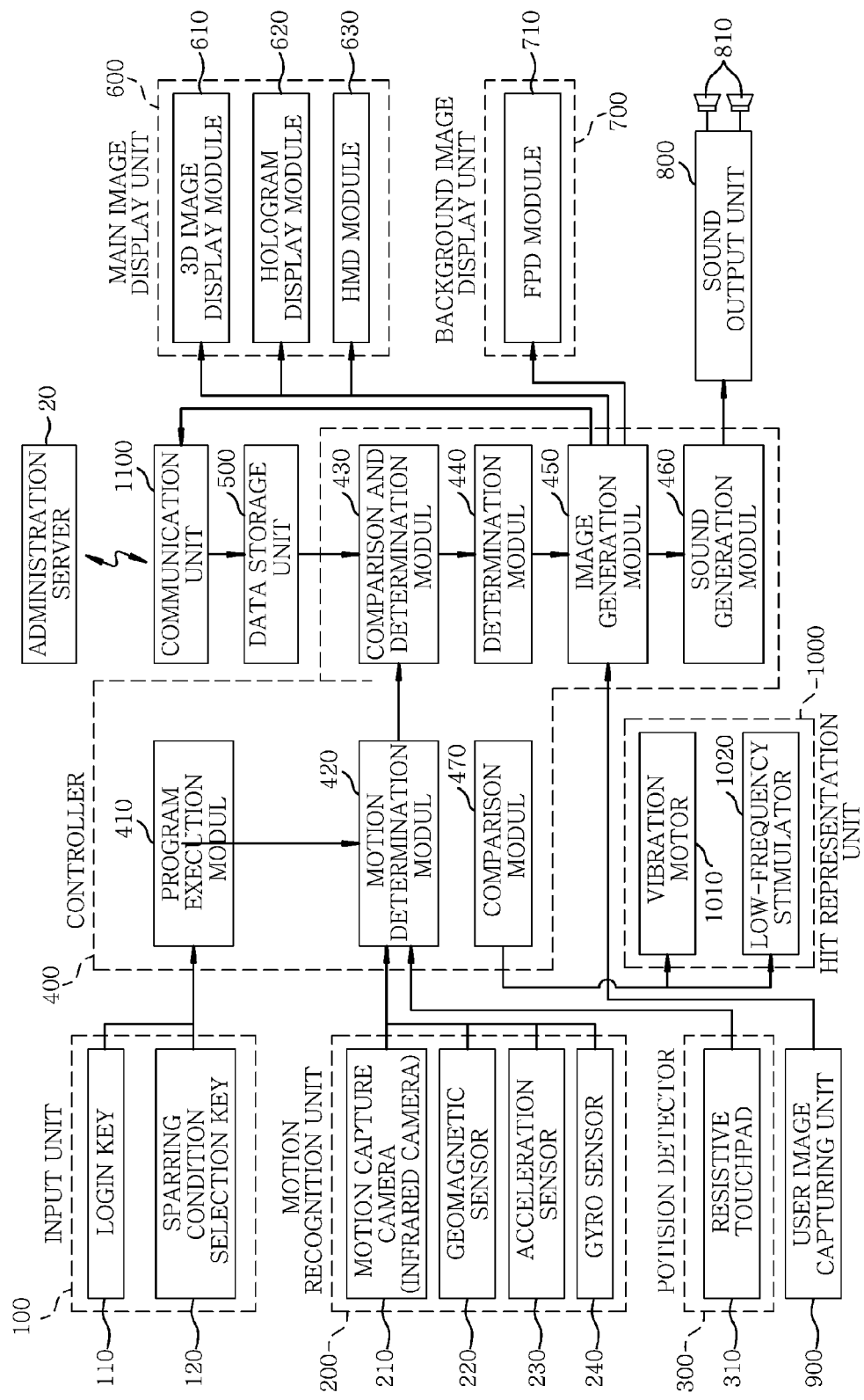
FIG. 2 is a block diagram of the user terminal of FIG. 1.
Figure 3:
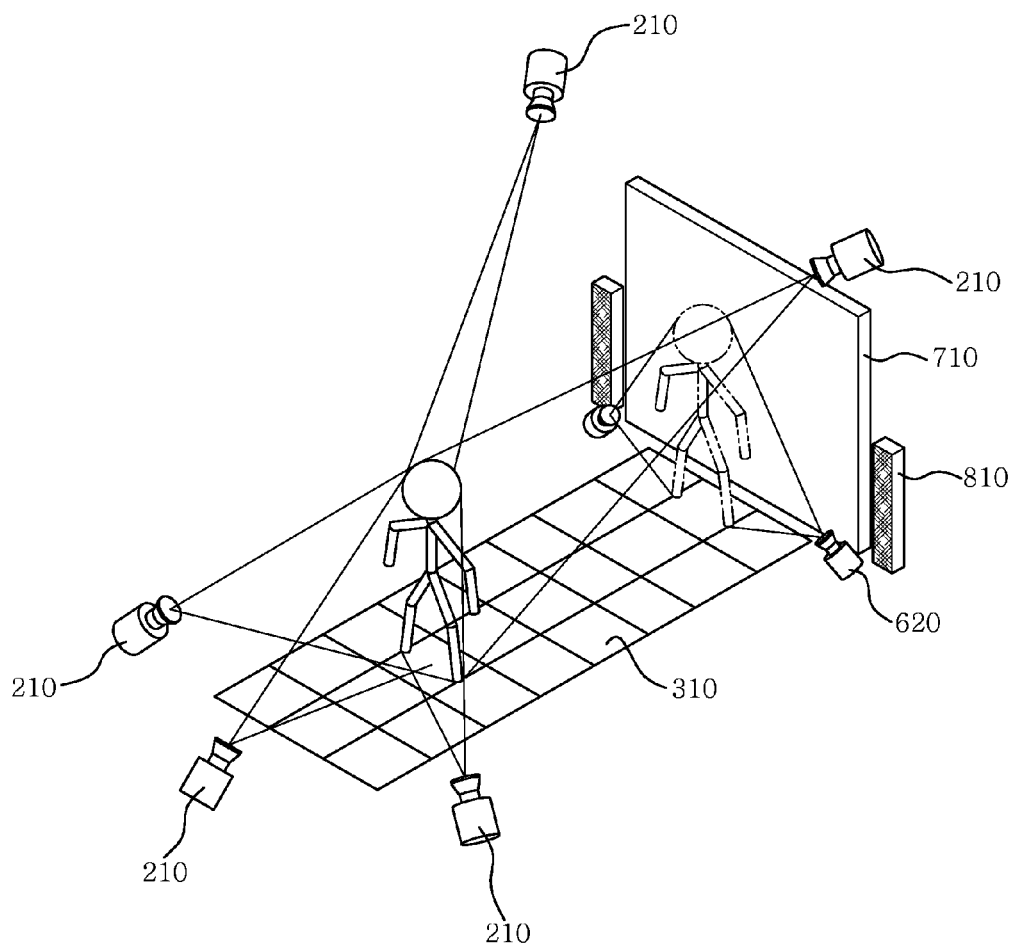
FIG. 3 is a perspective view illustrating a system for virtual martial arts sparring implemented using a hologram according to an embodiment of the present invention.
Figure 4:
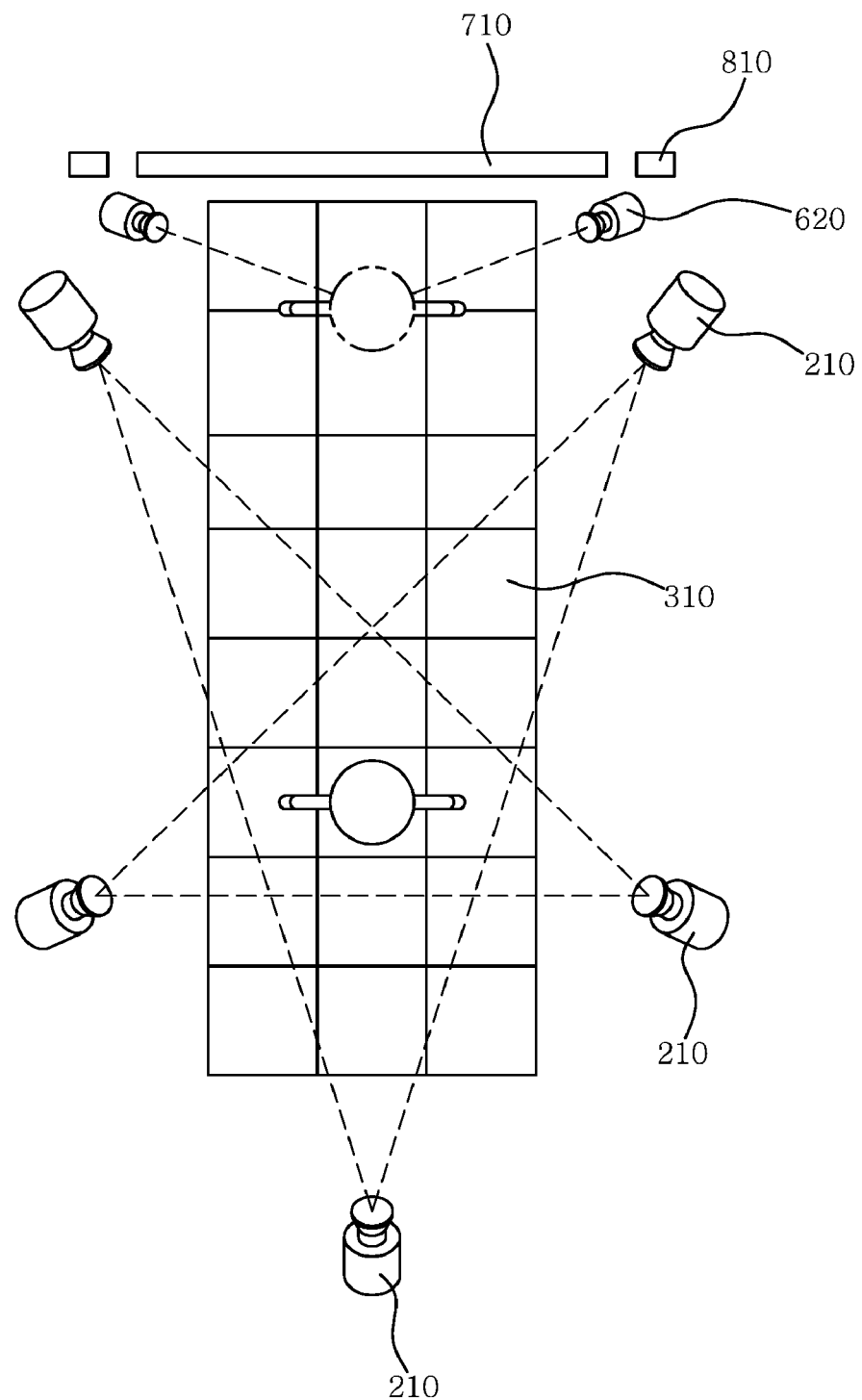
FIG. 4 is a plan view of FIG. 3.

FIG. 2 is a block diagram of the user terminal of FIG. 1. FIG. 3 is a perspective view illustrating a system for virtual martial arts sparring implemented using a hologram according to an embodiment of the present invention, and FIG. 4 is a plan view of FIG. 3.

As shown in the drawing, the user terminal 50 according to embodiments of the present invention includes an input unit 100, a login key 110, a sparring condition selection key 120, a motion recognition unit 200, motion capture cameras 210, a geomagnetic sensor 220, an acceleration sensor 230, a gyro sensor 240, a position detector 300, a resistive touchpad 310, a controller 400, a program execution module 410, a motion determination module 420, a comparison module 430, a determination module 440, an image generation module 450, a sound generation module 460, a hit representation module 470, a data storage unit 500, a main image display unit 600, a three-dimensional (3D) image display module 610, 3D glasses 611, a hologram image display module 620, a head mounted display (HMD) module 630, a background image display unit 700, a flat panel display (FPD) module 710, a sound output unit 800, speakers 810, a user image capturing unit 900, a hit representation unit 1000, a vibration motor 1010, a low-frequency stimulator 1020, and a communication unit 1100.

The input unit 100 receives the user information to allow the user to log in, and selects discipline, grade, area, and sex-specific sparring conditions. To this end, the input unit 100 includes the login key 110 and the sparring condition selection key 120.

The login key 110 identifies the user based on the received user information. The user may log in by inputting numbers, characters, etc. to the login key 110 or using a card or an electronic chip.

The sparring condition selection key 120 selects one condition or a combination of conditions from among a plurality of the previously stored discipline, grade, area, and sex-specific sparring conditions.

The motion recognition unit 200 recognizes a user motion. To this end, the motion recognition unit 200 may include the plurality of motion capture cameras 210 as shown in FIG. 3.

The plurality of motion capture cameras 210 are disposed to take pictures of the user from various angles, and recognize a motion of the user by detecting motions of a plurality of markers attached to the user's body using infrared photography. Here, the markers may be attached to the user's head, torso, wrists, and ankles, and the user's body may be thought of as a set of articular models having a link structure.

As generally known, motion capture denotes an operation of digitally recording a motion of a human body using sensors attached to the body. This technology is used to cause a virtual character to perform the same motion using position values of sensors attached to several parts of an actual body. In other words, motion capture may refer to a process of storing a motion of an actual object as numerical data and transferring the motion data to a virtual object generated by a computer. In this specification, "motion capture" refers to an operation of inputting a motion of an actual object to a computer and storing the motion as numerical data in the computer. In brief, the process includes attaching a sensor capable of sensing a motion to an object and storing numerical data of a motion of the object at regular intervals. Images processed by computer graphics (CG) technology using motion capture show a soft curve, that is, a realistic motion, and thus have high quality. To this end, special markers (sensors) are attached to a person's joints. Then, positions and rotational data of the markers are recognized by a special device in real time to generate a motion data set or a motion curve. In an infrared reflector scheme, six to eight cameras two-dimensionally detect markers at joints of a motion actor and three-dimensionally track and capture a motion.

Alternatively, the motion recognition unit 200 may include at least one of the geomagnetic sensor 220, the acceleration sensor 230, and the gyro sensor 240 attached to the user's body.

The geomagnetic sensor 220 senses a direction of terrestrial magnetism. The geomagnetic sensor 220 senses the magnetic field of the earth to obtain direction information, such as north, south, east and west, like a compass.

The acceleration sensor 230 senses an acceleration by accelerating a piezoelectric material. The acceleration sensor 230 makes use of a principle whereby an electric charge is generated when a general piezoelectric material is accelerated.

The gyro sensor 240 senses an angular acceleration based on a vertical force of a rotating angle. A Coriolis force is generated in the vertical direction of a rotating angle, and the gyro sensor 240 senses the vertical force using the same principle as the acceleration sensor.

The position detector 300 may detect a position of the user and a shift of the user's weight, etc. by detecting a position and the pressure of the user's feet on a plane. The resistive touchpad 310 disposed in the form of a footboard on a bottom surface may be employed by the position detector 300.

The resistive touchpad 310 has a predetermined area, and is formed of two panels stacked to generate resistance at a pressed portion, thus measuring a position and pressure of the coordinates pressed by the user's feet.

The data storage unit 500 stores a sparring program according to the discipline, grade, area, and sex-specific sparring conditions corresponding to the selection of the input unit 100, and stores the user information and an evaluation result.

The data storage unit 500 may be various data storage means such as a hard disk drive (HDD) and a random-access memory (RAM).

The controller 400 executes the sparring program stored in the data storage unit 500 according to the selection of the input unit 100, determines an accurate user motion in 3D space with reference to the user motion recognized by the motion recognition unit 200 and the position of the user's feet detected by the position detector 300, compares the user motion in 3D space with a sparring partner motion performed by the sparring program to calculate an effective attack value, calculates the corresponding points to accumulate winning or deduction points, generates the user motion image and the sparring partner motion image using a previously stored virtual character, generates a user hit reaction image and a sparring partner hit reaction image using a virtual character of the sparring partner according to the determined effective attack value, and generates a signal representative of a hit according to the effective attack value.

To this end, the controller 400 includes the program execution module 410, the motion determination module 420, the comparison module 430, the determination module 440, the image generation module 450, the sound generation module 460, and the hit representation module 470.

The program execution module 410 executes the sparring program stored in the data storage unit 500 in accordance with the discipline, grade, area, and sex-specific sparring conditions selected by the input unit 100.

The motion determination module 420 determines the accurate user motion in 3D space with reference to the user motion recognized by the motion recognition unit 200 and the position of the user's feet detected by the position detector 300.

The comparison module 430 determines whether the user motion and the received sparring partner motion overlap each other in a predetermined space.

When the comparison module 430 determines that the user motion and the sparring partner motion overlap each other, the determination module 440 determines the effective attack value according to movement speed, distance, position, and angle of the respective motions, and calculates the corresponding points according to the effective attack value to accumulate winning or deduction points.

More specifically, the effective attack value covers a predetermined range. The number of times of the user has sparred may be counted, and the range of the effective attack value may be gradually reduced as the number of times sparring has been performed increases, so that the accuracy of the effective attack value increases. Thus, the user can naturally obtain skills and improve the skills within the ability of the user's body.

The image generation module 450 generates the user motion image and the sparring partner motion image using the previously stored virtual character, and generates the hit reaction images using the virtual character of the sparring partner according to the effective attack value determined by the determination module 440.

The sound generation module 460 generates sound effects and background music according to the user and sparring partner motion images and hit reaction images generated by the image generation module 450.

The hit representation module 470 generates the signal representative of a hit and outputs the generated signal representative of a hit.

The communication unit 1100 exchanges information with the communication means 26 of the network server 20. In particular, the user information, the sparring partner information, the sparring progress information, the signal representative of a hit, and the motion images are exchanged.

Embodiments of the present invention may further include a user image capturing unit 900 which captures an image of the user. In this case, the controller 400 may generate the user motion image using the image actually captured by the user image capturing unit 900.

The main image display unit 600 displays the user motion image and the sparring partner motion image of the controller 400.

One of the 3D image display module 610, the hologram image display module 620, and the HMD module 630 may be employed by the main image display unit 600.

Also, embodiments of the present invention may further include the background image display unit 700 displaying an effect image and a background image on the general FPD module 710. The effect image and the background image are generated by the image generation module 450. At this time, the effect image and the background image may be generated according to the user and sparring partner motion images and hit reaction images.

For example, a blue star may be displayed as an effect image of a kick motion, and a red circle may be displayed as an effect image of a punch motion. Otherwise, while an image of fireworks is displayed as a background image, the respective effect images may be displayed as overlaying the background image.

Figure 5:
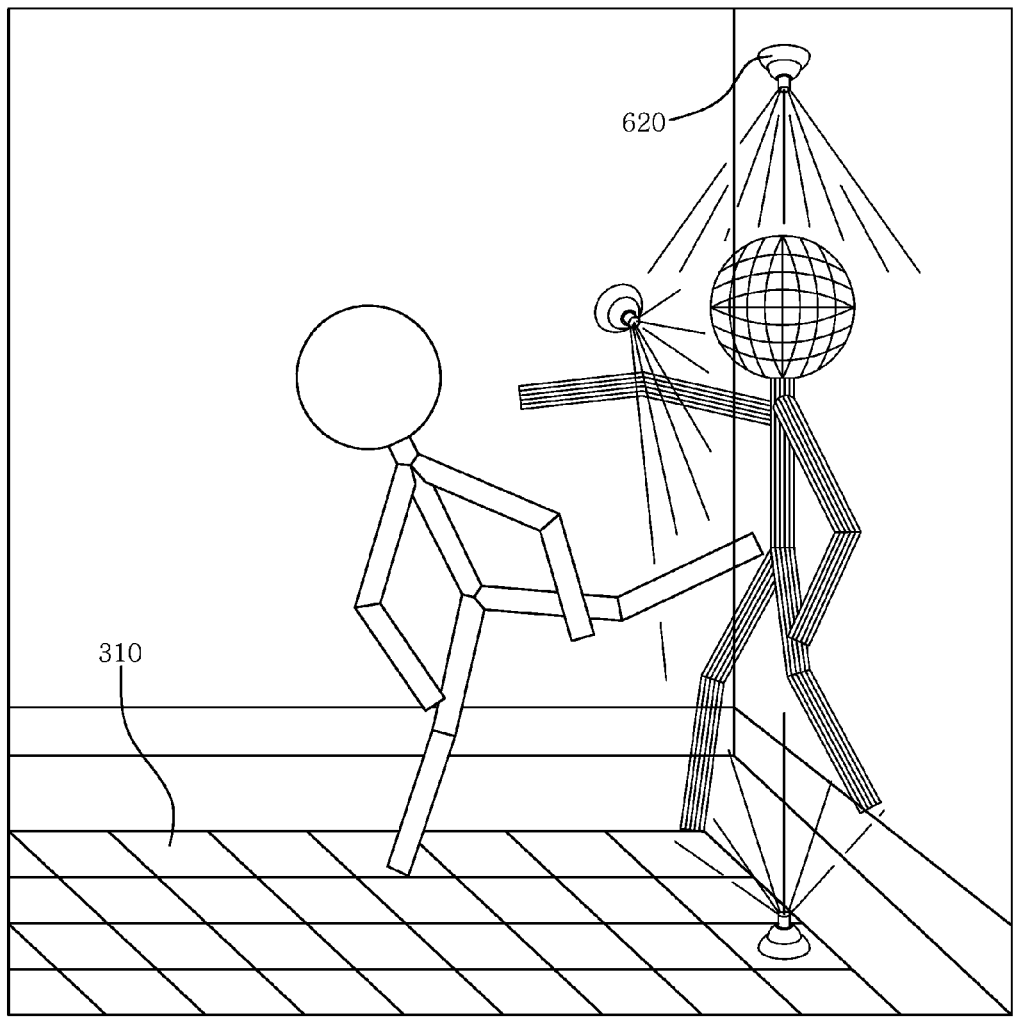
FIG. 5 is a conceptual diagram showing an example in which an image is implemented using a hologram display module.

As shown in FIG. 5, the hologram image display module 620 generates interference fringe patterns using the principle of holography, thereby displaying successive 3D images.

FIG. 5 is a conceptual diagram showing an example in which an image is implemented using a hologram display module. As generally known, a hologram denotes a 3D image that is generated using the principle of holography and shown to be the same as an actual object, and also a medium in which interference fringe patterns showing a 3D figure are recorded. The principle of holography causes a laser to directly emit one beam of output light to a screen and to emit another beam of the output light to an object that the user wants to see. Here, the beam directly illuminating the screen is referred to as a reference beam, and the other beam illuminating the object is referred to as an object beam. Since the object beam is light that has been reflected from respective surfaces of the object, phase differences (distances from the respective surfaces of the object to the screen) differ from each other depending on the surfaces of the object. Here, the reference beam that has not been modified interferes with the object beam, and the corresponding interference fringe patterns are shown on a screen. A film in which such interference fringe patterns are stored is referred to as a hologram. To display the stored image again, the beams used for recording should be projected to the screen again. Since only a wave having the same frequency as a wave for the recording is displayed in three-dimensions and waves not having the same wavelength and phase as the wave for the recording pass through the stored hologram with no effect, the beams used for replay should be exactly the same as the reference beam used for the recording.

Figure 6:
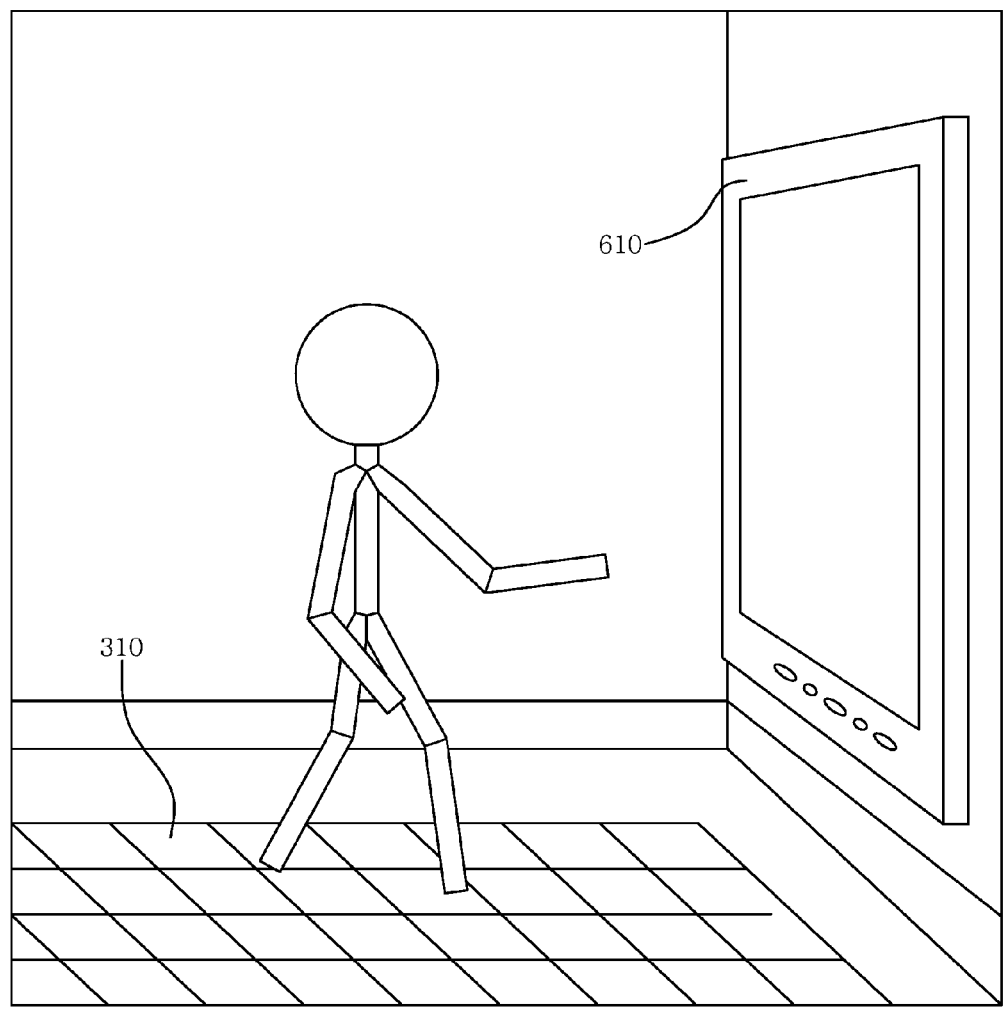
FIG. 6 is a conceptual diagram showing an example in which an image is implemented using a three-dimensional (3D) image display module.
Figure 7:
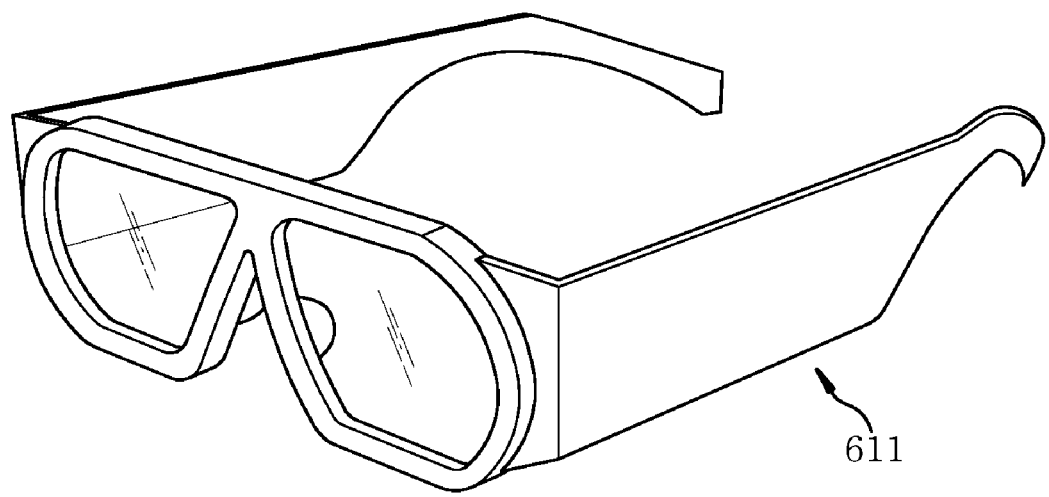
FIG. 7 illustrates the 3D glasses of FIG. 6 according to an embodiment of the present invention.

As shown in FIGS. 6 and 7, the 3D image display module 610 displays a 3D image, which is three-dimensionally viewed via the 3D glasses 611 worn by the user, on the screen. The main image display unit 600 may be a general FPD, such as a liquid crystal display (LCD), a light emitting diode (LED) display, or a plasma display panel (PDP), and used with the 3D glasses 611 worn by the user, so that a 3D image can be displayed on the screen.

FIG. 6 is a conceptual diagram showing an example in which an image is implemented using a 3D image display module, and FIG. 7 illustrates the 3D glasses of FIG. 6 according to an embodiment of the present invention. The 3D glasses 611 may be polarized glasses or liquid crystal shutter glasses. The polarized glasses allow images captured by two cameras to be separately viewed according to vertical and horizontal light information, thereby giving a 3D effect.

The liquid crystal shutter glasses let the user see with his or her two eyes in turn by alternately closing the glasses, thereby giving a 3D feeling. The liquid crystal shutter glasses require electric power, and may be implemented to have a battery and to be rechargeable in embodiments of the present invention.

The 3D glasses 611 according to embodiments of the present invention have temples, but the temples may be formed as a band to improve the feeling of wearing them.

Figure 8:
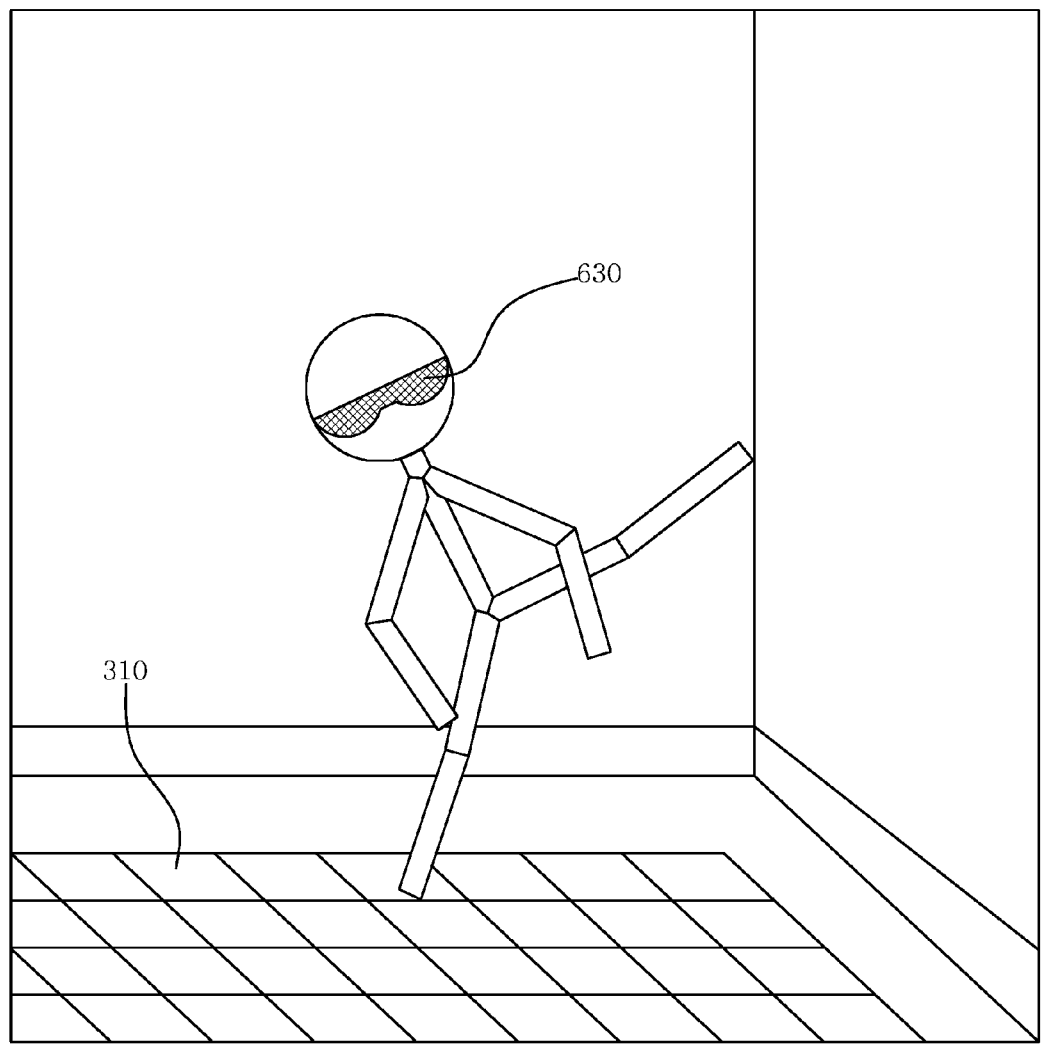
FIG. 8 is a conceptual diagram showing an example in which a head mounted display (HMD) module is used.
Figure 9:
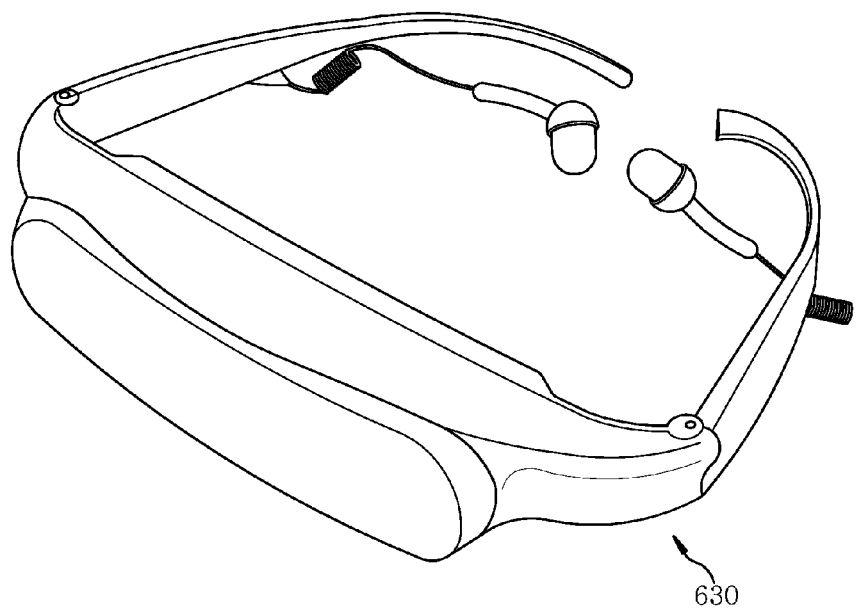
FIG. 9 illustrates the HMD module of FIG. 8 according to an embodiment of the present invention.

FIGS. 8 and 9 illustrate an example in which the HMD module 630 is employed by the main image display unit 600.

FIG. 8 is a conceptual diagram showing an example in which an HMD module is used, and FIG. 9 illustrates the HMD module of FIG. 8 according to an embodiment of the present invention. The HMD module 630 is a display device put on the user's head, and displays an image generated by the image generation module 450 on an HMD screen.

The HMD module 630 is classified as a mono or stereo type, and an open or closed type according to the shape. Like in a theater, the HMD module 630 limits the user's vision, thereby enabling absorption in an image. As a screen of the HMD module 630, a cathode ray tube (CRT) or LCD is used. In embodiments of the present invention, the LCD may be used to reduce power consumption and improve the feeling of wearing.

Meanwhile, as illustrated in FIG. 2, the background image display unit 700 displays the effect image and the background image generated by the image generation module 450.

To this end, the general FPD module 710 may be employed by the background image display unit 700. The FPD module 710 refers to any FPD such as an LCD, an LED display, or a PDP.

The sound output unit 800 outputs sound effects and background music generated for each of a main image, the effect image, and the background image by the sound generation module 460 through the speakers 810.

Although two speakers are shown in the drawings of the present invention, five or more speakers may be disposed to implement 3D sound such as 5.1 CH sound.

Figure 10B:
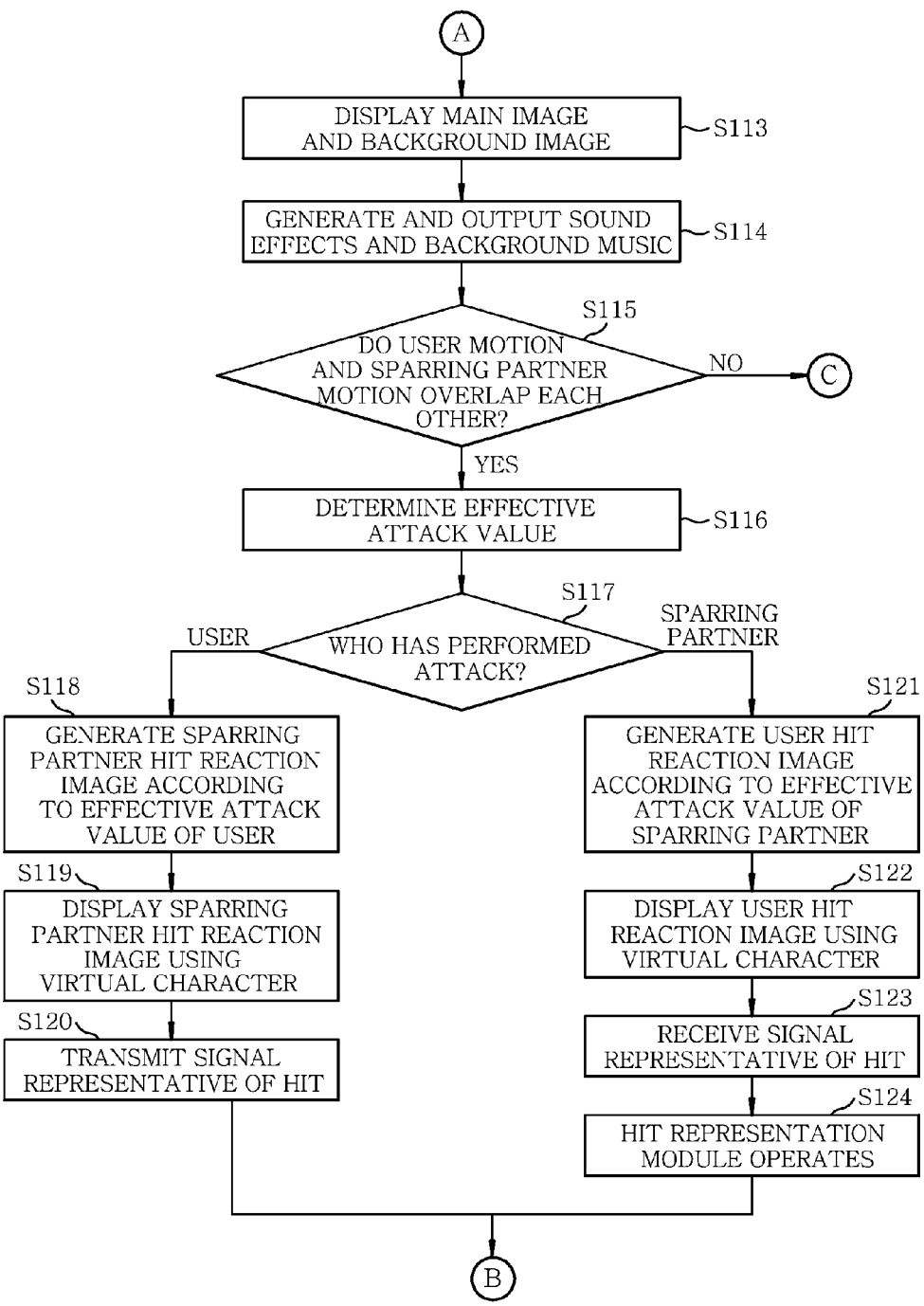

FIGS. 10A to 10C are flowcharts illustrating a method for virtual martial arts sparring using a network according to embodiments of the present invention. Operation of embodiments of the present invention constituted as described above will be described with reference to the appended drawings.

First, the user information management means 21 of the network server 20 accessing the Internet 40 receives user information transmitted from the user terminal 50, compares the user information with information previously stored in the user information DB 31, and allows a user to log in (S101 to S103)

At this time, using the login key 110 of the input unit 100 of the user terminal 50, the user inputs the user information with numerals, characters, etc., thereby logging into the network server 20. Alternatively, the user may log in using an integrated circuit (IC) card or an electronic chip to which the user information has been input.

When logging in has completed, sparring partner information is received from the network server 20, and discipline, grade, area, and sex-specific sparring conditions are selected using the sparring condition selection key 120 and transmitted (S104 and S105).

The sparring partner information includes grade, area, and sex information about another user terminal 51 which has logged into the network server 20 and has been waiting for sparring. The sparring partner information is managed by the sparring partner information management means 22 and stored in the sparring partner information DB 32.

The sparring progress information management means reads sparring progress information according to the selection from the sparring progress information DB 33 and transmits the sparring progress information to the user terminal, and the user terminal 50 executes a sparring program according to the sparring progress information (S106 and S107).

When the sparring program is executed, the motion recognition unit 200 of the user terminal 50 detects a movement speed, a distance, a position, and an angle of the user, thereby recognizing a user motion (S108).

Also, the position detector 300 detects the position of the user's feet on a plane, and the controller 400 determines an accurate user motion in 3D space with reference to the user motion recognized by the motion recognition unit 200 and the position of the user's feet detected by the position detector 300 (S109 and S110).

The image generation module 450 generates a user motion image using a previously stored virtual character, and also causes the communication unit 1100 to transmit the user motion image to the network server 20 (S111).

Also, a sparring partner motion image is received from the network server 20, and the user motion image and the sparring partner motion image generated by the image generation module 450 are displayed together with a background image on the main image display unit 600 (S112 and S113).

At this time, the image generation module 450 of the controller 400 may further generate an effect image and the background image according to the user motion image and the sparring partner motion image, and separately display the effect image and the background image on the background image display unit 700.

The background image display unit 700 may additionally display the effect image and the background image generated by the image generation module 450 behind the main image display unit 600, thereby causing an image of the user displayed by the main image display unit 600 to be seen as being more three-dimensional. At this time, the main image display unit 600 may include a hologram or transparent screen on which an image can be projected.

Also, the sound output unit 800 outputs sound effects and background music generated by the sound generation module 460 (S114).

Thereafter, the controller 400 compares the user motion in 3D space with the sparring partner motion to determine an effective attack value (S115 and S116).

To be specific, the comparison module 430 and the determination module 440 of the controller 400 may determine whether the user motion and the sparring partner motion overlap each other in a predetermined space, and determine an effective attack value according to movement speed, distance, position, and angle of the respective motions when it is determined that the user motion and the sparring partner motion overlap each other.

After this, the controller 400 generates a user motion image and a sparring partner motion image using the previously stored virtual character, and generates a user hit reaction image and a sparring partner hit reaction image using a virtual character of the sparring partner according to the determined effective attack value. The hit reaction images generated by the controller 400 may each be displayed on the main image display unit 600.

To be specific, it is determined whether the user has performed an attack. When it is determined that the user has performed the attack, a sparring partner hit reaction image is generated according to an effective attack value of the user and displayed using a virtual character, and also a signal representative of a hit is transmitted (S117 to S120).

On the other hand, when it is determined that the sparring partner has performed the attack, a user hit reaction image is generated according to an effective attack value of the sparring partner and displayed using a virtual character, and also a signal representative of a hit is transmitted (S121 to S123).

While the respective hit reaction images are displayed, the user motion is not realized as an image and is on standby, and the hit representation unit 1000 generates physical vibrations or a physical impact in response to the signal representative of a hit from the hit representation module 470 of the controller 400 and applies them to the user's body (S124).

Thereafter, points corresponding to the effective attack value are determined to accumulate winning or deduction points (S125).

When such a sparring process is finished, the corresponding sparring partner information and the corresponding sparring progress information are transmitted to update the sparring partner information DB 32 and the sparring progress information DB 33, an evaluation result is displayed on a screen, data is stored, and then the program is finished (S127 to S129).

In the above-described system and method for virtual martial arts sparring using a network according to embodiments of the present invention, a plurality of terminals sense each motion of a user to generate a 3D image, and perform a sparring process through network data communication, so that the user can effectively perform sparring with a virtual character of a sparring partner in a house, a gym, or an academy by himself or herself without temporal and spatial constraints and risks such as injury can be prevented.

In addition to the field of martial arts, embodiments of the present invention can be applied to various fields in which it is possible to learn standardized motions, for example, dance, gymnastics, and sports.

While the embodiments of the present invention and their advantages have been described in detail, it should be understood that various changes, substitutions and alterations may be made herein without departing from the scope of the invention.

What is claimed is:

1. A system for virtual martial arts sparring using a network, comprising:
a user terminal configured to access the Internet to exchange user information with a network server, receive sparring partner information to retrieve and select a discipline, a grade, an area, and sex-specific sparring conditions, receive sparring progress information according to the selected sparring conditions to execute a corresponding sparring program, and perform a sparring function by exchanging a user motion image, a sparring partner motion image, and a signal representative of a hit;
a network server configured to comprise user information management means for receiving user information from the user terminal and comparing the user information with previously stored information to allow a user to log in, sparring partner information management means for transmitting the sparring partner information to the user terminal and updating and managing grade, area, and sex information and sparring records on a sparring partner, sparring progress information management means for transmitting the sparring progress information to the user terminal and updating and managing a sparring sequence, winning and deduction point information, victory and defeat information, and ranking information, image information management means for receiving the user motion image transmitted from the user terminal, performing an update with the user motion image, and managing the user motion image, and communication means for exchanging information with the user terminal;
data management means configured to comprise a user information database (DB) for storing the user information, a sparring partner information DB for storing the sparring partner information, a sparring progress information DB for storing the sparring progress information, and an image information DB for storing the user motion image, and configured to input and output the respective pieces of information in response to a request from the network server; and
a network administrator terminal configured to access the network server to exchange network administrator information and manage the system;
wherein the user terminal comprises:
an input unit configured to receive the user information to allow the user to log in and select the discipline, grade, area, and sex-specific sparring conditions;
a motion recognition unit configured to detect a movement speed, a distance, a position, and an angle of the user to recognize a user motion;
a position detector configured to detect a position of the user's feet on a plane;
a data storage unit configured to store the sparring program in accordance with the discipline, grade, area, and sex-specific sparring conditions corresponding to the selection of the input unit and store the user information and an evaluation result;
a controller configured to execute the sparring program stored in the data storage unit according to the selection of the input unit, determine a user motion in three-dimensional (3D) space with reference to the user motion recognized by the motion recognition unit and the position of the user's feet detected by the position detector, compare the user motion in 3D space with a sparring partner motion received from the network server to determine an effective attack value, wherein the effective attack value is determined according to factors comprising the movement speed, the distance, the position and the angle of the user motion, calculate corresponding points to accumulate winning or deduction points, generate the user motion image and the sparring partner motion image using a previously stored virtual character, generate a user hit reaction image and a sparring partner hit reaction image using a virtual character of the sparring partner according to the determined effective attack value, and generate the signal representative of a hit according to the determined effective attack value;
a main image display unit configured to display the user motion image and the sparring partner motion image of the controller;
a hit representation unit configured to generate physical vibrations or a physical impact in response to the signal indicative of a hit from the controller and apply them to the user's body; and
a communication unit configured to exchange the user information, the sparring partner information, the sparring progress information, the signal representative of a hit, and the motion images with the communication means of the network server and transfer the pieces of information, the signal representative of a hit, and the motion images to the controller.

2. The system of claim 1, wherein the sparring progress information management means determines, records, and manages sparring rankings according to area, age, and sex.

3. The system of claim 2, wherein an area of the user terminal is checked based on an Internet protocol (P) address of the user allocated by an Internet service provider (ISP).

4. The system of claim 1, wherein the input unit comprises:
a login key configured to receive the user information and allow the user to log in; and a sparring condition selection key configured to select at least one Thorn among the discipline, grade, area, and sex-specific sparring conditions.

5. The system of claim 1, wherein the motion recognition unit comprises a plurality of motion capture cameras configured to detect movement of a plurality of markers attached to the users body using infrared photography to recognize the user motion.

6. The system of claim 1, wherein the motion recognition unit comprises at least one of a geomagnetic sensor configured to sense a direction of terrestrial magnetism, an acceleration sensor configured to sense an acceleration by accelerating a piezoelectric material, and a gyro sensor configured to sense an angular acceleration based on a vertical force of a rotating angle, wherein the at least one of the sensors is attached to the users body or clothing.

7. The system of claim 1, wherein the position detector comprises a resistive touchpad configured to measure the position of coordinates pressed by the user's feet, having a predetermined area, and formed of two panels stacked to generate a resistance at a pressed portion.

8. The system of claim 1, wherein the controller comprises:
a program execution module configured to execute the sparring program stored in the data storage unit in accordance with the discipline, grade, area, and sex-specific sparring conditions selected by the input unit;
a motion determination module configured to determine the user motion in 3D space with reference to the user motion recognized by the motion recognition unit and the position of the user's feet detected by the position detector;
a comparison module configured to determine whether the user motion and the sparring partner motion received from the network server overlap each other in a predetermined space;
a determination module configured to determine the effective attack value according to movement speed, distance, position, and angle of the respective motions, calculate the corresponding points, and accumulate the winning or deduction points when the comparison module determines that the user motion and the sparring partner motion overlap each other;
an image generation module configured to generate the user motion image and the sparring partner motion image as a main image using the previously stored virtual character, and generate the hit reaction images using the virtual character of the sparring partner according to the effective attack value determined by the determination module; and
a hit representation module configured to generate and output the signal representative of a hit according to the effective attack value.

9. The system of claim 8, wherein the image generation module further generates an effect image and a background image according to the user motion image of the main image display unit, and comprises a background image display unit configured to display the effect image and the background image on a flat panel display (FPD) module.

10. The system of claim 9, wherein the controller further comprises:
a sound generation module configured to generate sound effects and background music according to the main image, the effect image, and the background image generated by the image generation module; and
a sound output unit configured to output the sound effects and the background music generated by the sound generation module using a speaker.

11. The system of claim 1, wherein the main image display unit comprises;
3D glasses worn by the user; and
a 3D image display module configured to display a 3D image to be three-dimensionally viewed via the 3D glasses on a screen.

12. The system of claim 1, wherein the main image display unit comprises a hologram image display module configured to display successive 3D images by generating interference fringe patterns using a principle of holography.

13. The system of claim 1, wherein the main image display unit comprises a head mounted display (HMD) module configured to be put on the user's head and to display a realized image on an HMD screen.

14. The system of claim 1, further comprising a user image capturing unit configured to capture an image of the user, wherein the controller generates the user motion image using the image captured by the user image capturing unit.

15. A method for virtual martial arts sparring using a network, comprising:
receiving, at user information management means of a network server accessing the Internet, user information from a user terminal, and comparing the user information with information previously stored in a user information database (DB) to allow a user to log in;
receiving, at the user terminal, sparring partner information, and selecting and transmitting discipline, grade, area, and sex-specific sparring conditions, reading, at sparring progress information management means, sparring progress information according to the selection from a sparring progress information DB and transmitting the sparring progress information to the user terminal, and executing, at the user terminal, a sparring program according to the sparring progress information;
detecting, at a motion recognition unit of the user terminal, a movement speed, a distance, a position, and an angle of the user to recognize a user motion, detecting, at a position detector, a position of the user's feet on a plane, and determining, at a controller, a user motion in three-dimensional (3D) space with reference to the user motion recognized by the motion recognition unit and the position of the user's feet detected by the position detector;
generating, at the controller of the user terminal, a user motion image using a previously stored virtual character according to the user motion, transmitting the user motion image, receiving a sparring partner motion image from the network server, displaying the user motion image and the sparring partner motion image as a main image together with a background image on a main image display unit, and generating and outputting sound according to the main image and the background image;
determining whether the user motion and a sparring partner motion received from the network server overlap each other in a predetermined space, and when the user motion and the sparring partner motion overlap each other, determining an effective attack value according to movement speeds, distances, positions, and angles of the respective motions, generating and displaying a hit reaction image using a virtual character of a sparring partner according to the determined effective attack value, and exchanging a signal representative of a hit according to the effective attack value to operate a hit representation module; and
calculating corresponding points according to the effective attack value to accumulate winning or deduction points, transmitting corresponding sparring partner information and corresponding sparring progress information to update a sparring partner information DB and the sparring progress information DB, and displaying an evaluation result on a screen.

16. The method of claim 15, wherein an area of the user terminal is checked based on an Internet protocol (IP) address of the user allocated by an Internet service provider (ISP).

17. The method of claim 15, wherein the recognizing the user motion comprises attaching a plurality of markers to the user's body and detecting motions of the markers using infrared photography using a plurality of motion capture cameras to recognize the user motion.

18. The method of claim 15, wherein the recognizing the user motion comprises sensing a direction of terrestrial magnetism using a geomagnetic sensor attached to the users body or clothing, accelerating a piezoelectric material and sensing an acceleration using an acceleration sensor, or sensing an angular acceleration based on a vertical force of a rotating angle using a gyro sensor, to recognize the user motion.

19. The method of claim 15, wherein the displaying the main image comprises further generating, at the controller, an effect image and the background image, and displaying, at a background image display unit, the effect image and the background image on the screen.

20. The method of claim 15, wherein the outputting the sound comprises generating, at the controller, sound effects and background music according to the user motion image and the sparring partner motion image, and outputting, at a sound output unit, the sound effects and the background music using a speaker.

21. The method of dam 15, wherein the displaying the main image comprises displaying a 3D image viewed through 3D glasses worn by the user on the screen using a 3D image display module, displaying successive 3D images by generating interference fringe patterns based on a principle of holography using a hologram image display module, or putting a head mounted display (HMD) module on the user's head to display a realized image on an HMD screen.

\* \* \* \* \*